Oct. 21, 1958
G. E. EGGLESTON ET AL
2,856,758
VARIABLE NOZZLE COOLING TURBINE
Filed Oct. 31, 1955
2 Sheets-Sheet 1
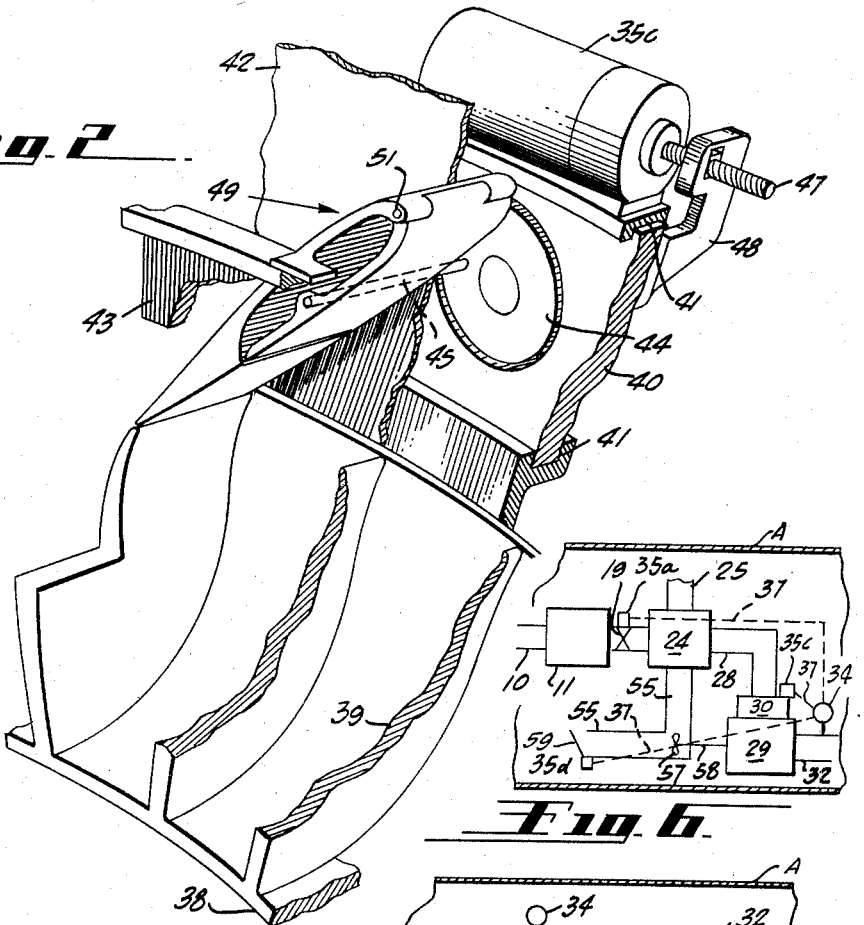
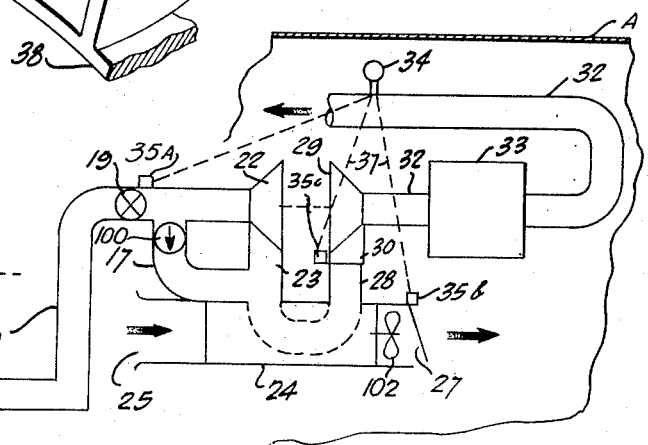
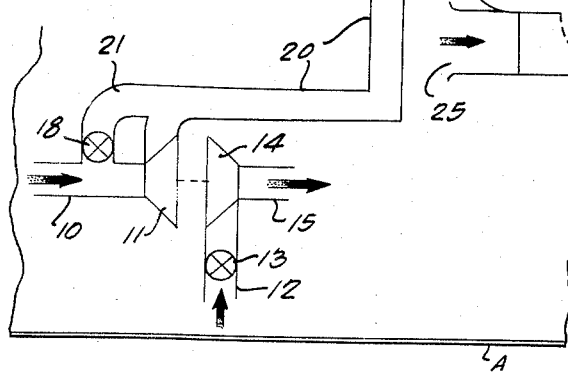
INVENTORS
GLEN E. EGGLESTON AND
REINO E. LUOTO
BY Edwin Coates
- ATTORNEY -

Oct. 21, 1958 G. E. EGGLESTON ET AL 2,856,758
VARIABLE NOZZLE COOLING TURBINE
Filed Oct. 31, 1955 2 Sheets-Sheet 2

INVENTORS
GLEN E. EGGLESTON AND
REINO E. LUOTO
BY Edwin Coates
ATTORNEY 2,856,758
VARIABLE NOZZLE COOLING TURBINE Glen Elwood Eggleston and Reino E. Luoto, Los Angeles, Calif., assignors to Douglas Aircraft Company, Inc., Santa Monica, Calif.

Application October 31, 1955, Serial No. 543,880

5 Claims. (Cl. 62—88)

This invention relates to systems for conditioning the air in enclosures, such as airplane cabins, and particularly as to the temperature of such air. Although the invention probably finds its greatest utility in controlledly cooling said air, it will become apparent that it can also be equally well employed in controlledly heating the cabin air.

In such contemporaneous systems, the cooling of the cabin air is ultimately accomplished by a cooling turbine unit which is fed compressed air from a primary compressor. The air temperature downstream of the cooling unit is controlled by mixing turbine discharge air with air bypassed around the turbine. The cooling turbine receives the air to be cooled for the cabin thru turbine nozzles of a fixed, invariable size or area. Consequently, the operation of the throttling valve disposed in the cooling-air stream between the usual series-connected air compressors and the intercooler for the hot compressed air enables less cooling for a given power expenditure. One reason for this deficiency is that the discharge pressure from the primary compressor is thereby limited and since the air density decreases with the altitude, a fixed area nozzle cannot pass all the air out of the turbine, or supercharger, so that part of the air must be by-passed completely around this turbine. This throttling of the by-passed air and the mixing of the hot and cold air streams causes an inherent loss of efficiency for a given primary compressor discharge pressure and air flow. Naturally, the operating efficiency of the system is diminished by this throttling and mixing or stratification of the air-streams.

The present invention provides a cabin air-conditioning system which obtains at least the same efficiency of cooling, or heating, that is achieved by contemporary systems of the same rated capacity. Further, it increases the cooling capacity of a given-rated system at higher altitudes while reducing the amount and weight of equipment.

More specifically, by means of the present arrangement, which includes a cooling turbine with variable area nozzles arranged in novel cooperation with the remainder of the system, when the craft is at the higher altitudes or in seasons or regions of lower temperature, the needed decrease in cooling is effected without employing the aforementioned by-passing. Further, the system obviates all mixing valves, yet accurately achieves any desired control of the cabin temperature, "up" or "down," at substantially all flight altitudes. Thus, the relative stratification of the hot air from the compressor with the cold turbine discharge air, entailed by the use of the former mixing valves, and resulting in "stratified" conditioning of the cabin air, cannot occur in the present system.

Other advances achieved by the invention will either be made manifest or become apparent as this disclosure proceeds.

Mainly in order to render the inventive concepts more concrete, that one of the presently-contemplated embodiments of the invention which is now preferred is illustrated in the accompanying drawings and will be described hereinafter in conjunction therewith.

In these drawings:

Figure 1 is a diagrammatic view of a cooling and heating system for the cabin of an aircraft that incorporates the present invention;

Figure 2 is a fragmentary perspective view, partly in section, of a variable area inlet-nozzle system for the radial cooling turbine employed in the present system.

Figure 6 is a diagrammatic view, similar to Figure 1, of another form of the present system.

Figure 3:
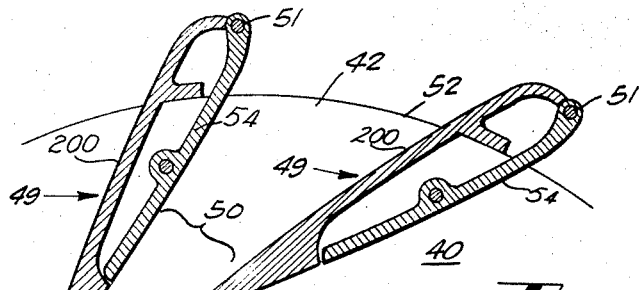
Figure 3 is a sectional diagrammatic view of the inlet nozzle-ring and the turbine rotor with a pair of the flow-controlling vanes adjusted to establish the widest area of air inlet into the cooling turbine from the intercooler.

The system diagramed in Figure 1 includes, in an aircraft cabin A, a ram-air inlet conduit 10 for cabin air in which is included a primary air-compressor 11 driven by a turbine 14 in turn driven by an engine-bleed conduit 12 that includes a shut-off valve 13, turbine 14 including an exhaust 15.

A conduit 20 leads hot compressed air from the compressor 11 onwardly in the system and a conduit 21 is provided to lead ram air around the compressor into conduit 20, when the primary compressor is not operating a check-valve 18 being provided in conduit 21.

A throttling valve 19 is provided farther on in conduit 20 for heating purposes, as will be self-evident.

A secondary compressor 22 terminates the path of conduit 20 for compounding the pressurizing (and heating) effect of compressor 11 but may be by-passed when turbine cooling is not necessary. A by-pass valve 100 is provided in the bypass 17 for this purpose.

Secondary compressor 22 discharges highly compressed (and heated) air into the "worked-on" pass, as shown, of a surface-contact, air-to-air heat exchanger 24. The "working" fluid of 24 is derived from an independent source, 25, of ram air, boosted, if desired, by a suction fan, as shown, driven by a manually controlled electromotor. Or, the suction fan may be employed only when the craft is grounded.

In the discharge conduit of heat exchanger 24 there is disposed a flap-valve 27 for controlling the ram-air outlet rate, and hence the rate of cooling, of this intercooler, as and for purposes later described.

The secondary compressor 22 is drivingly coupled to a "cooling" turbine, or energy-dissipating work instrumentality, 29. The work-expending member 29 is, in turn, driven by the compressed air worked on in intercooler 24, a conduit 28, among other means, being provided for this purpose.

Thus, since there are indicated direct mechanical power means drivingly connecting only the prime-mover 29 and the compressor 22, a so-called "boot-strap" powering relationship is established between members 29, 22 and 24, as well as between 22, 29, 24 and the one single source and path of aerodynamic air.

Properly flow-connected to the cooled air leaving the intercooler is a turbine inlet nozzle-unit 30 of any suitable or desired known manufacture of the variable area type. For example, that type of variable area nozzle unit known as the "Fink variable area (Venetian blind) nozzle unit" and widely employed since about 1900, may be employed.

As shown in Figures 2, 3, 4 and 5, this unit essentially comprises an actuator ring 40 which is rotatively-oscillatably mounted between grooved mounting rings 41 and bears a plurality of vanes 49 constructed and arranged mutually, and operable, to variably define inlet channels 50, Figure 3, to the blades 39 of the rotor 38 of turbine 29. More specifically, this Fink-type device also includes a rear wall 42 and a front wall 43 that enclose the oscillatable nozzle-ring 40. On the nozzle-ring a plurality of rotative-cam type vane actuators 44 are disposed in facewise attitude, members 44 being spaced apart equidistantly, one to a pair of rotor blades. Each rotary-cam actuator 44 is adapted to actuate a vane-unit 49, when the ring 40 is oscillated, by means of a pin 45 projecting therefrom into pivoted engagement with the smaller, less-cambered blade 54 of the adjacent clam-shell type vane-unit 49. Each vane-unit 49 is pivotally supported on the upper ring-mount 41 by means such as the pin 51, which passes thru the upper end of the larger, more highly cambered blade 200 of the vane unit.

As shown in Figure 3, when the ring 40 is in its extreme leftward position because of counterclockwise rotation thereof, as by means of an electromotor 35C, as and for purposes later described, the inlets 50 are at their widest cross-sectional area, although the center-lines of the vanes 49 are then closest together, for the "clam-shells" are now closed. When, as in Figure 4, the ring 40 is in its extreme rightward position, having been oscillated to that position by reverse operation of motor 35C, the clam-shells are, by means of 44, 45 and 51, urged into their fully-open positions, thus minimizing inlets 50. Intermediate positions of the ring 40 of course dispose the short blade of one vane-unit at intermediate positions with reference to the long blade of the adjacent unit, as shown in Figure 5.

Figures 4, 5:
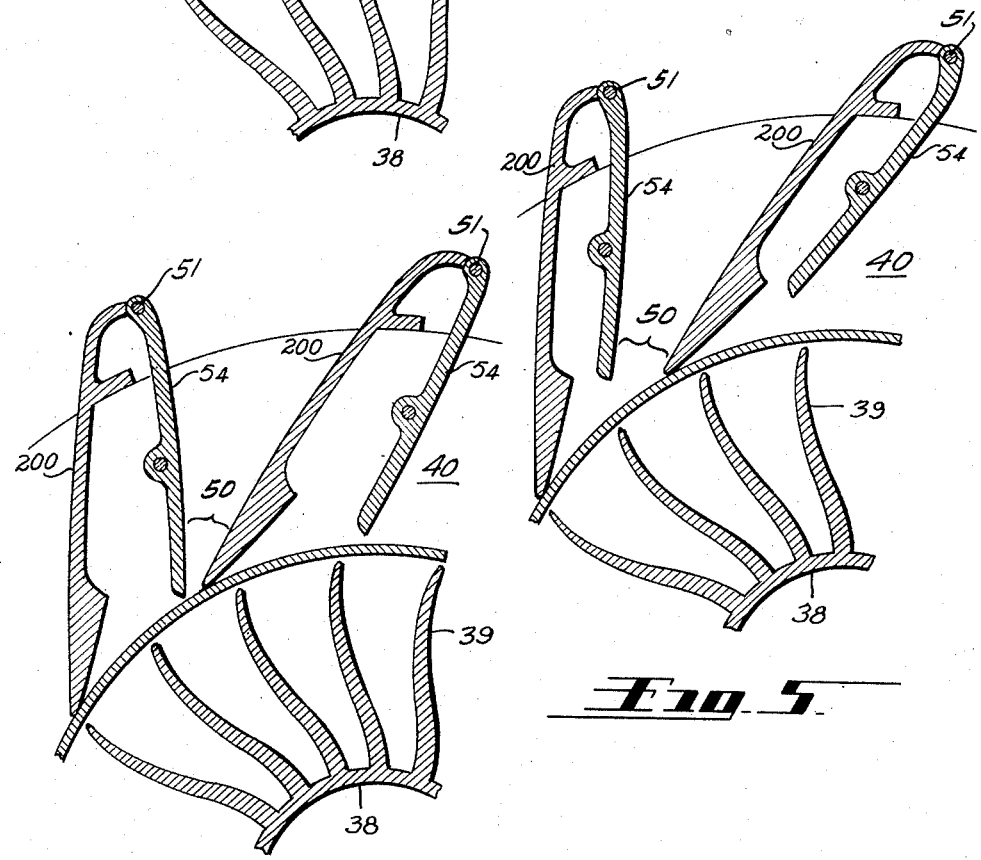
Figure 4 is a similar view depicting the vanes adjusted to afford the minimum inlet area to said turbine.
Figure 5 is a similar view illustrating the vanes adjusted to afford an inlet area to the turbine that is of an intermediate size.

The vane-attitudes of Figure 4 are those automatically conferred, by means of cabin-temperature responsive means described infra, at the lower altitudes or in warmer climes or seasons, whereas for opposite such conditions, the vanes assume the attitudes of Figure 3. The aforesaid cabin-temperature responsive means comprise a "thermistor" 34 disposed in the cabin and having its voltage-output connected by suitable conductor paths, indicated at 37, to three electromotors, one of which, 35C, operates the nozzle-ring 40. Another, 35A, of these motors operates throttling valve 19 and the third, 35B, operates the flap 27.

The variably-cooled discharge of variably pressurized air from turbine 29 is dehumidified by passage thru a dehumidifier 33, whence the tempered air is suitably passed, by means of a duct 32, into the cabin-system.

As shown in Figure 1, for occasions when the craft is grounded and no ram air is available, the suction-fan 102, driven by a manually controlled electromotor, provides in the "ram" air outlet from the intercooler, is hand controlled to provide the air flow otherwise provided by ram air in 25.

Since there is no mixing valve in this system, and no air is by-passed around the cooling turbine, the presence of the desirable throttling valve 19 does not curtail the amount of cooling of the cabin since it is not used during cooling, concomitant to a given overall power expenditure. There being no mixing valve, there is also no stratification of the cooled air with the hot air in the duct after the cooled air leaves the turbine 29.

At any and all altitudes, control of cabin air temperature is automatically and accurately accomplished, either by varying the turbine inlet nozzle-area or varying the opening of intercooler flap 27 or valve 19 or all.

The variable-area nozzle means automatically controls the temperature of air-discharge from the turbine. When the nozzle area is decreased, the primary compressor increases its discharge temperature and pressure and the secondary compressor's discharge-temperature and pressure, for any given flow-rate, also increase. As a consequence, the heat exchanger extracts more heat from the compressor-air flowing therethrough so that the turbine-discharge temperature increases.

The heat exchanger's outlet flap accurately and automatically controls the amount of "working" fluid passing through the heat exchanger and controls the temperature of the fluid worked-on and passed to the turbine.

Partial closing of the back pressure exerting throttle valve 19 causes the discharge pressure and temperature of the primary compressor to increase, allowing the cabin to be heated rather than cooled.

The net result of the actions of this association of general functionalities, in various degrees and combinations of actions and effects, is a novel cabin-air temperature control ssytem that automatically maintains a rather unusual efficiency of operation at any given available pressure at the discharge of the primary compressor.

Obviously, this system may be rigged to vary the cabin temperature upwardly, as well as downwardly. Further, instead of the thermistor control, pilot-operated controls may be employed.

In Figure 6 there is shown another mode of execution of the inventive concepts in which the energy of the cooling turbine is applied to positively accelerate the passage of the ram air through the intercooler in order to provide a greater rate of cooling of the cabin air with considerably less power-expenditure in the compression phase of the system.

To this, and other, ends the secondary compressor of the preceding species is omitted as well as the aforesaid by-pass and the ram air outlet duct 55 is provided in continuation of ram air inlet duct 25. Exhaust fan 57, driven by turbine 29 (no longer driving a secondary compressor), is provided in duct 55. Fan 57 runs continually and draws the ram air out of the intercooler 24 at an accelerated rate. The outlet terminus of duct 55 is controlled by a flap valve 59 operated by an electromotor 35D controlled by thermistor 34, as before.

The fan shown incidentally in Figure 1 is operated only when the craft is on the ground, by means of an ordinary manually controllable electromotor, not shown, whereas the exhaust fan 57 continually employs the turbine energy previously devoted to driving the secondary compressor.

Although in describing a typical embodiment of the inventive concepts certain constructional components have been referred to in detail, it is to be understood that such detail is employed solely for clarity and in no wise restricts this invention to the construction disclosed. The scope of the invention is as set forth in the sub-joined claims.

We claim:

1. A system for controlling the temperature of an enclosure in an aircraft, comprising: a source of aerodynamic circumambient air; a conductor or flow-path connected to said source; air-compressing means having an inlet connected to said flow-path; heat-exchange means, including a passage for working air and a passage for worked-on air and an outlet for cooled, worked-on air; inlet means connecting said heat-exchange means to said flow-path of aerodynamic air; means for directly connecting said compressing means and said heat-exchange means in series-flow with each other and with said flow-path of aerodynamic air for passing the air from said compressing means to said heat-exchange means; an expansion-air operated prime-mover flow-connected in series to the outlet from said heat-exchange means and thus connected in series in the flow-path of said aerodynamic air, said prime-mover having a cooled air outlet; and direct-acting mechanical power transmission means solely connecting said prime-mover directly to said compressing means only, so as to effect undivided, concentrated driving of the compressing means entirely by the expansion energy of the prime-mover thereby to establish a bootstrap powering relationship of the compressing means, heat-exchange means and the prime-mover in the aforesaid single path of aerodynamic air; area-varying means in the inlet connection of said prime mover to said heat-exchange means, said area-varying means being independently effective for varying the inlet area of compressed air admitted to said prime-mover, and means connecting the outlet of said prime-mover to said enclosure; whereby to confer upon said system the maximum enclosure-cooling capability for a given power-input expenditure of the compressing-means over a widened range of altitudes of the aircraft.

2. An airplane cabin air temperature control system, comprising: a source of aerodynamically pressurized atmospheric ram air; compressor-means inlet-connected to said source; an air-to-air surface contact heat exchanger having its working-fluid pass connected to said source, and having an outlet therefrom for said ram air; outflow controlling means in said outlet; means directly connecting said compressor-means and said heat exchanger in series for the flow of air from said compressor means through the worked-on-fluid pass in said heat exchanger; fluid-actuated energy dissipating, work-accomplishing means connected to the worked-on fluid pass in said heat exchanger for doing useful work and concurrently cooling said worked-on fluid, said work-accomplishing means having an outlet; a direct, mechanical driving connection from said work-accomplishing means to said compressor-means so as to effect direct driving of the compressor means by the fluid-actuated work-accomplishing means; means in the means connecting said work-accomplishing means to the air from said heat exchanger for varying the inlet area to said work-accomplishing means; means connecting the outlet of said work-accomplishing means to said cabin; cabin-temperature responsive means disposed in said cabin and connected to area-controlling means for actuating said area-controlling means; and respective connections between said temperature-responsive means and said area-varying means for controlling the temperature of said cabin.

3. In an airplane cabin air temperature controlling system, the subcombination that comprises: a pair of air-compressing means flow-connected in series; an expansion-type prime mover; an air duct flow connecting the compressing means and the prime mover; heat-exchange means interposed operatively in said duct and entraining extraneous air to cool the air admitted to said heat exchanger by said duct, said entrained air having an outlet; mechanical power transmission means directly connecting said prime-mover to at least one of said air-compressing means so as to enable the former to drive the latter and set up a "boot-strap" relationship between the air-compressing means, the heat-exchange means and the prime-mover; back-pressure applying throttling means operatively interposed between the members of said pair of air-compressing means; and means in said heat exchanger outlet responsive to the cabin air temperature for varying the size of the outlet in direct ratio to the degree of cooling desired in said heat exchanger.

4. A method of controlling the temperature in an enclosure surrounded by circumambient atmosphere, comprising: segregating a portion of said atmosphere therefrom; compressively elevating the pressure thereof; cooling the aforesaid portion while accelerating the rate of cooling airflow through the cooling zone by means of air-expansion energy developed in a zone located onwardly in the system for the final action on said segregated portion of the circumambient atmosphere; expanding the cooled portion in direct, linear proportion to the air temperature in said enclosure while supplying pressure-elevating mechanical energy to the zone wherein the segregated portion of atmosphere has its pressure compressively elevated; and passing the expanded, further cooled air into said enclosure.

5. A system for controlling the temperature of the air in an enclosure, comprising: a source of aerodynamic, extraneous, air; air-compressing means inlet-connected to said source and having an outlet; heat-exchange means disposed onwardly in the system from the compressing means; said heat-exchange means including a working-side for passage of said aerodynamic air therethrough and a worked-on side for passage therethrough of compressed air from said air-compressing means; inlet means flow-connecting said heat-exchange means independently to said source of aerodynamic air; outlet means connected to said heat-exchange means for emitting cooled air from the heat-exchange means; means connecting said air-compressing means and the heat-exchange means for passing air from said compressing means to said heat-exchange means; air-expansion operated prime-mover means flow-connected to the outlet from said heat-exchange means, thereby to establish series-flow connection to said source of aerodynamic air for the compressing-means, the heat-exchange means and the prime-mover; direct, mechanical power-transmission means directly and unilaterally connecting the prime-mover solely to the compressing means so as to effect driving of the compressing means solely by all of the expansion energy of said prime-mover, thereby to establish a boot-strap powering relationship of the compressing means, heat-exchange means and prime-mover to the same source of aerodynamic air; area-varying means disposed in the flow-path connection of said prime-mover to said heat-exchange means for varying the inlet area for air from the aforesaid outlet of said heat-exchange means into said prime-mover; a conduit extending to atmosphere from the working-fluid side of said heat-exchange means; a powered exhaust fan in said conduit for accelerating flow of said aerodynamic air through said heat-exchange means; and means flow-connecting the outlet of said prime-mover to said enclosure.

References Cited in the file of this patent

UNITED STATES PATENTS

| | | |
|---|---|---|
| 2,491,461 | Wood | Dec. 13, 1949 |
| 2,509,899 | Wood | May 30, 1950 |
| 2,585,570 | Messinger | Feb. 12, 1952 |
| 2,614,815 | Marchant | Oct. 21, 1952 |
| 2,637,984 | Bloomberg | May 13, 1953 |